United States Patent [19]

Yamada et al.

[11] 4,368,237
[45] Jan. 11, 1983

[54] PROCESS FOR PRODUCING MAGNETIC RECORDING DEVICE

[75] Inventors: Yasuyuki Yamada; Tatsuji Kitamoto; Goro Akashi, all of Odawara, Japan

[73] Assignee: Fuji Photo Film Co., Ltd., Kanagawa, Japan

[21] Appl. No.: 38,620

[22] Filed: May 14, 1979

Related U.S. Application Data

[63] Continuation of Ser. No. 838,790, Sep. 28, 1977, abandoned, and a continuation of Ser. No. 700,369, Jun. 28, 1976, abandoned.

[30] Foreign Application Priority Data

Jun. 26, 1975 [JP] Japan .................................. 50/79655

[51] Int. Cl.$^3$ .............................................. H01F 10/02
[52] U.S. Cl. ................................... 428/413; 427/128; 427/130; 428/425.9; 428/474.4; 428/522; 428/900
[58] Field of Search ................................ 427/127–132, 427/48, 388 C; 428/413, 425.9, 474.4, 900, 522

[56] References Cited

U.S. PATENT DOCUMENTS 3,967,045 6/1976 Kurobe et al. ................ 427/388 X
4,068,040 1/1978 Yamada et al. ...................... 427/128

Primary Examiner—Bernard D. Pianalto
Attorney, Agent, or Firm—Sughrue, Mion, Zinn, Macpeak & Seas

[57] ABSTRACT

A magnetic recording material having superior abrasion resistance and thermal stability is produced by coating a magnetic coating composition consisting essentially of aqueous emulsions of at least two resin binders capable of reacting with each other upon mixing, and being present therein in the separated state, and a ferromagnetic powder on a non-magnetic support, drying the coating, and curing the resulting magnetic recording layer where drying is insufficient to effect curing. Hazards ascribable to the use of organic solvents in conventional techniques can be obviated by this invention.

20 Claims, No Drawings

PROCESS FOR PRODUCING MAGNETIC RECORDING DEVICE

This is a continuation of application Ser. No. 838,790, filed Sept. 28, 1977, and a continuation of application Ser. No. 700,369, filed June 28, 1976, both now abandoned.

BACKGROUND OF THE INVENTION

1. Field of the Invention

This invention relates to a process for producing a magnetic recording material, more specifically, to a process for producing a magnetic recording layer of a magnetic recording material having a magnetic recording layer formed by coating.

2. Description of the Prior Art

According to conventional techniques, magnetic recording materials of the type in which the magnetic recording layer is formed by using a coating liquid are produced by kneading a ferromagnetic powder, a binder resin, additives and an organic solvent, mixing and dispersing them thoroughly using a dispersing machine, coating the resulting solution on a support, such as a plastic sheet, metal foil or paper, and drying the coating.

Use of organic solvents has recently led to various problems such as increased product cost due to increased organic solvent cost and the necessity for taking measures to protect against fire, pollution and toxicity to working personnel.

In an attempt to solve these problems, a method was suggested in which the magnetic coating composition is prepared in the form of an aqueous emulsion, for example, as disclosed in Japanese Patent Publication No. 46922/74. According to this method, an aqueous emulsion of a synthetic resin and a water-soluble adhesive is used. However, these materials can be applied only to a non-magnetic paper support because the former component has insufficient adhesiveness and strength, and the latter component does not have sufficient water resistance and strength. This method, therefore, is not applicable to non-magnetic supports such as plastics, metals or ceramics.

SUMMARY OF THE INVENTION

The present invention has overcome the above defects, and various objects of this invention are:

(1) To provide a process for producing a novel magnetic recording material using an emulsion-type binder instead of an organic solvent.

(2) To provide a process for producing a magnetic recording material having a magnetic recording layer prepared from an aqueous emulsion type magnetic coating composition which has good adhesion to any kind of non-magnetic support.

(3) To provide a magnetic recording material having a magnetic recording layer prepared from an aqueous emulsion type magnetic coating composition which has good curability.

(4) To provide a process for producing a magnetic recording material having superior abrasion resistance.

(5) To provide a process for producing a magnetic recording material having superior heat resistance.

(6) To provide a process for producing a magnetic recording material which does not cause atmospheric pollution.

(7) To provide a process for producing a magnetic recording material free from danger to humans.

Various research was performed to achieve these objects, and the invention provides a process for producing a magnetic recording material, which comprises coating a magnetic coating composition consisting mainly of a ferromagnetic powder, a binder and a coating liquid on a non-magnetic support and drying the coating to form a magnetic recording layer, wherein the binder consists of at least two components capable of reacting with each other upon mixing, and the magnetic coating composition having these components emulsified in water in the separated state is coated on the non-magnetic support and dried, followed by curing the resulting magnetic recording layer where drying is insufficient to effect curing.

DETAILED DESCRIPTION OF THE INVENTION

The ferromagnetic coating composition is prepared by separately emulsifying at least two binder components in water to form aqueous emulsions, each containing at least one binder component, and mixing these aqueous emulsions. If the components were dispersed in one system, components having reaction capability with each other would react with the passage of time. Accordingly, each component is maintained separate where reaction can occur at ambient conditions. The ferromagnetic powder is mixed with, or dispersed in, at least one of the above aqueous emulsions. The composition is thus seen to consist essentially of, at least as far as the binders are concerned, at least two binders which are separated from each other in water at the beginning of the processing, typically in the form of fine emulsified particles.

The curing of the magnetic recording layer occurs by the reaction of the binder components with each other, usually upon removal of moisture after coating and drying. Heating promotes this reaction, and renders the curing time shorter. Where the binder components are heat curable, it is necessary to heat the magnetic recording layer. While not to be construed as strictly limitative, certainly highly preferred conditions for drying and curing (where drying is not sufficient to effect curing) do exist, i.e., drying is preferably effected at about 50° C. to about 150° C. for about 2 to 10 minutes, even more preferably 80° to 120° C. in 3 to 8 minutes, whereafter, when necessary, curing is preferably conducted at 30° C. to 180° C. for about 10 seconds to about 120 hours, even more preferably at 50° to 140° C. for 10 minutes to 20 hours. Both drying and curing are conveniently performed at atmospheric pressure. In those instances wherein drying is sufficient to effect curing, the above drying temperature time range also applies.

The "binder components capable of reacting with each other", as referred to in the present specification and claims, denote polymers having functional groups which react with each other, preferably polymers which have at least 2, even more preferably 2–6 monofunctional groups. These components contain reactive groups, such as hydroxyl (—OH), carboxyl (—COOH), epoxy

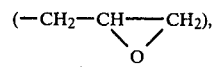

carbonyl (>C=O), amino (—NH₂) isocyanate (—NCO), or thiocyanate (—NCS), at, or between, the ends of their molecular chain. They are selected from polymers which react with each other, and, after heat-curing, which form a three-dimensional network structure, and include thermoplastic resins, thermosetting resins, and reactive resins. It should be noted, in this regard, that for practical purposes thermosetting resins can be considered "reactive resins", since both react to produce a 3-dimensional net-like structure. Generally, however, thermosetting resins require added heat to react, whereas reactive resins can be reacted at room temperature or with heating substantially less than that required for thermosetting resins.

In this regard, it is preferred that for any system which is utilized comprising a thermoplastic resin that the amount of thermoplastic resin be from 0 to about 15 weight % of the total amount of resin.

The thermoplastic resins are those having a softening point of not more than 150° C., an average molecular weight of a 10,000 to 200,000, and a degree of polymerization of about 200 to 2,000. Examples of the thermoplastic resins used in this invention are a vinyl chloride/vinyl acetate copolymer, a vinyl chloride/vinylidene chloride copolymer, a vinyl chloride/acrylonitrile copolymer, an acrylic acid ester/acrylonitrile copolymer, an acrylic acid ester/vinylidene chloride copolymer, an acrylic acid ester/styrene copolymer, a methacrylic acid ester/acrylonitrile copolymer, a methacrylic acid ester/vinylidene chloride copolymer; a methacrylic acid ester/styrene copolymer, a urethane elastomer, polyvinyl fluoride, a vinylidene chloride/acrylonitrile copolymer, a butadiene/acrylonitrile copolymer, polyamide resins, polyvinyl butyral, cellulose derivatives (e.g., cellulose acetate butyrate, cellulose diacetate, cellulose triacetate, cellulose propionate, or nitrocellulose), a styrene/butadiene copolymer, polyester resins, a chlorovinyl ether/acrylic acid ester copolymer, thermoplastic synthetic rubbers such as nitrile-butadiene rubber (NBR); styrene-butadiene rubber (SBR) and nitrile rubber, and mixtures thereof.

The thermosetting resins or reactive resins are those having a molecular weight of not more than 200,000 in the form of a coating liquid, the molecular weight of which, as a result of reactions such as condensation or addition-reaction, becomes infinite. Preferred among them are those which do not soften or melt until they decompose by heat. Specific examples of these resins are phenolic resins, epoxy resins, curable polyurethane resins, urea resins, melamine resins, alkyd resins, silicone resins, reactive acrylic resins, mixtures of high molecular weight polyester resins and isocyanate prepolymers, mixtures of methacrylic acid copolymers and isocyanate prepolymers, mixtures of polyester polyols and polyisocyanates, urea-formaldehyde resins, polyamine resins, and mixtures thereof.

Of these, the acrylic resins, epoxy resins, polyamide resins, polyurethane resins, and blocked polyisocyanates are preferred.

In the present invention, the acrylic resins denote copolymers consisting essentially of a unit derived from acrylic acid, acrylate esters, methacrylic acid, or methacrylate esters. A hydroxyl containing component introduced by a hydroxyalkyl acrylate or hydroxyalkyl methacrylate, and introduction of a carboxyl containing component, by acrylic acid, methacrylic acid, itaconic acid, etc. The acrylic resins preferably comprise greater than about 60 mol %, even more preferably greater than 75 mol %, of the above units, i.e., if thermoplastic monomers are copolymerized with the recited units, the amount thereof is 0 to about 40 mol %, even more preferably 0 to 25 mol %.

The acrylate esters or methacrylate esters are preferably alkyl esters, especially those where the alkyl moiety has 1 to 8 carbon atoms. Examples of these esters include methyl acrylate, ethyl acrylate, n-propyl acrylate, isopropyl acrylate, n-butyl acrylate, t-butyl acrylate, amyl acrylate, 2-ethylhexyl acrylate, 2-methyl-1-butyl acrylate, 3-methyl-1-butyl acrylate, 2-methyl-1-pentyl acrylate, 2-ethyl-1-butyl acrylate, methyl methacrylate, ethyl methacrylate, n-propyl methacrylate, isopropyl methacrylate, n-butyl methacrylate, t-butyl methacrylate, amyl methacrylate, 2-ethylhexyl methacrylate, 2-methyl-1-pentyl methacrylate, and 2-ethyl-1-butyl methacrylate.

The hydroxyalkyl acrylates or hydroxyalkyl methacrylates suitably contain 1 to 12 carbon atoms in their alkyl moiety. Examples of these esters are hydroxymethyl acrylate, hydroxyethyl acrylate, hydroxybutyl acrylate, hydroxyethylhexyl acrylate, hydroxymethylbutyl acrylate, hydroxypentyl acrylate, hydroxyhexyl acrylate, hydroxyheptyl acrylate, hydroxyoctyl acrylate, hydroxynonyl acrylate, hydroxydecyl acrylate, hydroxydodecyl acrylate, hydroxyundecyl acrylate, hydroxymethyl methacrylate, hydroxyethyl methacrylate, hydroxypropyl methacrylate, hydroxyethylhexyl methacrylate, hydroxymethylpentyl methacrylate, hydroxypentyl methacrylate, hydroxyhexyl methacrylate, hydroxyheptyl methacrylate, hydroxyoctyl methacrylate, hydroxynonyl methacrylate, hydroxydecyl methacrylate, hydroxydodecyl methacrylate, and hydroxyundecyl methacrylate.

Hydroxyalkylacrylates or hydroxyalkylmethacrylates in which the alkyl group contains 2 to 8 carbon atoms are especially preferred.

The acrylic resins having a hydroxyl group introduced thereinto may contain a thermoplastic monomer, such as acrylonitrile, vinyl acetate, vinyl chloride, styrene, butadiene, acrylamide, or methacrylamide, copolymerized therein.

The acrylic resins are composed of (a) acrylic acid, methacrylic acid, or esters of these acids, and either: (b) about 0.01 to about 10% by weight, preferably 0.01 to 10% by weight, calculated as hydroxyl groups, of hydroxyalkyl acrylates or hydroxy acrylates; or (c) about 1 to about 30% by weight, preferably 1 to 30% by weight, calculated as carboxyl groups, of acrylic acid, methacrylic acid or itaconic acid. Where the another component (a thermoplastic monomer) is present, the ratio of (a) acrylic acid, methacrylic acid or esters of these acids or esters to (d) thermoplastic monomer is 4 to 7: 6 to 3, and the acrylic resin contains (b) or (c).

Acrylic resins containing both components (b) and (c) can also be used.

Acrylic resins having a hydroxyl group and/or a carboxyl group introduced thereinto preferably have a viscosity of about 3,000 to about 100,000 centipoises (determined at 30° C. for a 30% by weight toluene solution), especially 5,000 to 70,000 centipoises, and a degree of polymerization of about 700 to about 10,000.

These acrylic resins and methods for the production thereof are disclosed, for example, in the Japanese publication "Synthetic Polymers III", pages 219 to 434, edited by Murahashi, Imoto and Tani, published on Jan. 25, 1971 by Asakura Shoten, and in U.S. Pat. Nos. 2,789,099; 2,878,237; 2,922,815; 2,923,692; 2,927,911;

2,930,768; 2,934,525; 2,937,163; 2,956,046; 2,958,679; 2,973,286, 2,978,501; 3,016,370; 3,021,295; 3,032,538; 3,040,011; 3,062,797; 3,066,118; 3,114,737; 3,137,660; 2,220,867; 2,289,540; 2,306,071; 2,440,090; 2,626,944; 2,916,469; 2,925,399; 2,958,674; 2,972,592; 3,000,690; 3,018,197; 3,035,004; 3,054,783; 3,108,088; and 3,141,870, and in West German Pat. Nos. 1,032,922; 1,079,836; 1,113,090; 1,111,828; and 1,141,455.

The epoxy resins used in the present invention are synthetic resins containing at least two epoxy groups

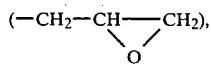

preferably 2 to 6 epoxy groups, and include epoxy compounds represented by the following general formula [I], and copolymers of their derivatives with addition polymerizable monomers.

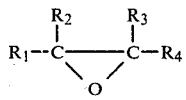

wherein $R_1$, $R_2$ and $R_3$ represent hydrogen or $C_nH_{2n+1}$, in which n is an integer of 1 to 6, and $R_4$ represents a monovalent group containing an addition polymerizable group of 2 to 9 carbon atoms.

The epoxy-containing monomers of general formula [I] specifically include, for example, those of the halogenated biphenol, resorinol, bisphenol F (resulting from the use of formaldehyde instead of acetone in the synthesis of bisphenol), tetrahydroxyphenylethane, novolac, polyalcohol, polyglycol, glycidyl ether (e.g., glycerin triether) or polyolefin, epoxidized soybean oil, and alicyclic types. Monoepoxidized diolefins, glycidyl acrylate, glycidyl methacrylate, aryl glycidyl ethers, vinyl glycidyl ether, and p-vinylphenyl glycidyl ether can also be utilized.

These epoxy groups, when used alone, do not induce a cross-linking reaction, but in the presence of a proton donor they form a cross-linked structure by a ring-opening reaction. Accordingly, the epoxy groups must be used in the presence of an acidic catalyst or in combination with the functional groups of a proton donor. Such acidic catalysts are well known in the art, and include, for example, p-toluene sulfonic acid. Specifically, the rate of cross-linking of an epoxy group alone, a combination of an epoxy group and a hydroxyl group or a combination of an epoxy group with an N-methylol ether group is very slow in the absence of a catalyst, but is markedly accelerated in the presence of an acid catalyst, for example, p-toluene sulfonic acid. On the other hand, in the case of copolymers in which an epoxy group is combined with a carboxyl group, the rate of cross-linking is very fast, even in the absence of a catalyst, and this combination shows the highest reactivity among the functional groups mentioned. The rate of cross-linking also differs according to the type of the unsaturated monomer used to introduce a carboxyl group, and becomes slower in the order of itaconic acid, methacrylic acid, and maleic anhydride. The low cross-linking rate of maleic anhydride can be determined by its ability to retain a proton.

The epoxy resins represented by general formula [I] above can be prepared, for example, by (A) reacting epihalohydrins with polyhydroxy compounds (polyols), (B) reacting epihalohydrins with polycarboxylic acids, or (C) oxidizing polyenes with ozone or peroxyacids.

In the case of (A) and (B), epichlorohydrins such as methyl epichlorohydrin and epibromohydrin, for example, are used as the epihalohydrins.

Examples of the polyhydroxy compounds used in the case of (A) include aromatic polyhydroxy alcohols, most preferably aromatic polyhydroxy alcohols having 2 to 5 hydroxy groups, such as bisphenol A (4,4'-dihydroxydiphenylpropane), tetrachlorobisphenol A, 4,4'-diaminodiphenyl propane, 4,4'-dihydroxyphenyl methane (bisphenol F), diphenolic acid, tetrahydroxyphenyl ethane, 3,3',3'',3'''-tetrahydroxytetraphenyl ethane, resorcinol, resorcinol-3-methoxyphenol, resorcinol-4-ethoxyphenol, and novolac resins such as of the formula

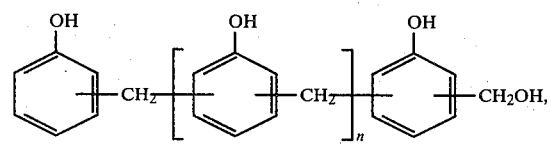

with typical values of n ranging from 3 to 100; aliphatic dialcohols and trialcohols, preferably having 2 to 8 carbon atoms, such as diethyl alcohol, trimethyl alcohol, triethyl alcohol, and tributyl alcohol; aliphatic diglycols and triglycols, preferably having 2 to 8 carbon atoms, consisting of polyalkylene oxides such as polyethylene oxide or polypropylene oxide, preferably having a polymerization degree of 200 to 1000; and glycerin ethers such as glycerin-1,3-diethyl ether, glycerin ether, glycerin triethyl ether, glycerin methyl diethyl ether, ethylene oxide, or propylene oxide.

Examples of the polycarboxylic acids used in the case of (B) include aliphatic or aromatic dibasic acids such as azelaic acid, 2,4-benzophenone-dicarboxylic acid, brassylic acid, 1,4-cyclohexanedicarboxylic acid, fumaric acid, glutaric acid, α-ketoglutaric acid, itaconic acid, maleic acid, malonic acid, octadecylmalonic acid, pimelic acid, phthalic acid, isophthalic acid, terephthalic acid, suberic acid, succinic acid, tetradecanedioic acid, and undecanedioic acid. Such are introduced to provide 0 to about 30 weight % of COOH groups for the epoxy resin.

Examples of the polyenes used in the case of (C) are vinylcyclohexene, cyclohexane oxide, epoxidized soy bean oil, butadiene, polybutadiene, polybutadiene oxide, and 1,5-hexadiene oxide.

Oxidation of these polyenes is carried out using peroxyacids such as an organic aliphatic carboxylic acid; i.e., acetic acid, propionic acid or butyric acid, or ozone.

The epoxy resins shown above specifically include, for example, 1-vinyl-3-cyclohexene diepoxide, dicyclopentadiene diepoxide, 1,5-hexadiene diepoxide, 1,7-octadiene diepoxide, bis(3,4-epoxycyclohexylmethyl oxalate), bis(3,4-epoxycyclohexylmethyl pimarate), 3,4-epoxy-5-methylcyclohexylmethyl-3,4-epoxy-5-methylcyclohexane carboxylate, ethylene glycol diglycidyl ether, propylene glycol diglycidyl ether, butanediol diglycidyl ether, hexanediol diglycidyl ether, cyclohexanediol glycidyl ether, hexahydroxylylenediol diglycidyl ether, bisphenol-A-diglycidyl ether, p,p-dihydroxydiphenyl ether diglycidyl ether, dihydroxybenzene diglycidyl ether, diglycidyl aniline, ethyl diglycidyl phosphate, decanediol diglycidyl ether, diethylene glycol diglycidyl ether, triethylene glycol diglycidyl ether, 1,4-bisbutanedicarbamic acid diglycidyl ether, sebacic acid diglycidyl ether, N,N-diglycidyl-p-methoxyaniline, diglycidyl butylamine, diglycidyl ethyleneurea, xylylenediol diglycidyl ether, dihydroxydiphenylsulfone diglycidyl ether, p-($\beta,\beta'$-dihydroxyethoxy) benzene diglycidyl ether, adipic acid diglycidyl ether, diglycidyl aniline, diglycidyl alanine, ethylene oxide diglycidyl ether, and diglycidyl ethers of aliphatic or aromatic acids such as azelaic acid, 2,4-benzophenonedicarboxylic acid, brassylic acid, 1,4-cyclohexanedicarboxylic acid, fumaric acid, glutaric acid, $\alpha$-ketoglutaric acid, itaconic acid, maleic acid, malonic acid, octadecylmalonic acid, pimelic acid, phthalic acid, isophthalic acid, terephthalic acid, suberic acid, succinic acid, tetradecanedioic acid, or undecanedioic acid.

Of these compounds, the diglycidyl compounds or diepoxides of $\alpha,\omega$-diolefins are especially preferred because of their reactivity and ease of availability.

These compounds are described, for example, in Japanese Patent Applications (Laid-Open) Nos. 79298/73 and 79299/73, U.S. Pat. Nos. 2,467,171; 2,506,486; 2,538,072; 2,581,464; 2,615,007; 2,640,037; 2,716,123; 2,841,595; 2,866,767; 2,750,395; 2,890,194; 3,030,336; 3,053,855; 3,075,999; 3,173,971; 3,562,275; 3,620,983; and 3,746,545, Cohen, J. Am. Chem. Soc., 75, 1733 (1952), Iwakura, *Makromol. Chem.*, 104 66 (1967), and "Epoxy Resin Technology", Interscience, John Wiley & Sons 1968, New York.

Since these epoxy resins contain an addition polymerizable monovalent substituent, they can be copolymerized with other addition polymerizable monomers.

Examples of such addition polymerizable comonomers are styrene, butadiene, isoprene, acrylonitrile, methacrylonitrile, acrylic acid, methyl acrylate, methacrylic acid, methyl methacrylate and ethyl methacrylate. Preferred combinations of copolymer components are, for example, styrene/butadiene/glycidyl acrylate, styrene/butadiene/glycidyl methacrylate, styrene/butadiene/allyl glycidyl ether, styrene/butadiene/vinyl glycidyl ether, styrene/isoprene/glycidyl acrylate, styrene/isoprene/glycidyl methacrylate, methyl methacrylate/butadiene/glycidyl acrylate, and methyl acrylate/butadiene/glycidyl methacrylate. This exemplification, however, does not limit the scope of this invention. Such comonomers are typically present in an amount of 0.3 mol % to 10 mol %.

The epoxy resins obtained by methods (A), (B) and (C) above have an epoxy equivalent of about 150 to about 4,000, preferably 400 to 1,000 and an average molecular weight of about 100 to about 4,000, preferably 400 to 1,400, to be most effective in the present invention. Solid epoxy resins are more convenient than liquid epoxy resins because the former have higher reactivity.

Many of such epoxy resins are commercially available. For example, there are Dow Epoxy DER 321, DER 332, DER 335, DER 336, DER 341, DER 431, DER 438, DER 434, DER 732, DER 736, and DER 741 (trademarks for products of Dow Chemical Co.), ARALDITE 538, GY 250, GY 252, GY 257, GY 260, GY 280, PZ 820, 6600 and 6700 (trademarks for products of Ciba Geigy A.G.), EPON (EPIKOTE) 152, 154, 828, 834, 836, 1010, 1004, 1007, and 1009 (trademarks for products of Shell Oil Co.), and EP 201, EP 206, and EP 207 (trademarks for products of Union Carbide Corp.).

The polyamide resins used in this invention are condensation polymers having amide units (—CONH—) in the main chain and containing recurring units of general formulae [II], [III], and [IV], which can be synthesized by any of methods (D), (E) and (F) described below.

(D) Condensation between diamines and dicarboxylic acids:

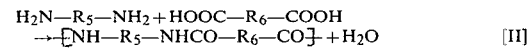

$$H_2N-R_5-NH_2+HOOC-R_6-COOH$$
$$\rightarrow \{NH-R_5-NHCO-R_6-CO\}+H_2O \quad [II]$$

(E) Condensation of amino acids:

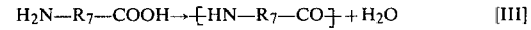

$$H_2N-R_7-COOH \rightarrow \{HN-R_7-CO\}+H_2O \quad [III]$$

(F) Ring-opening of lactams:

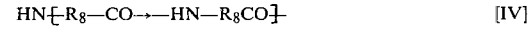

$$HN\{-R_8-CO\rightarrow -HN-R_8CO\} \quad [IV]$$

In these formulae (D) to (F), $R_5$, $R_6$ and $R_8$ represent a divalent group containing 1 to 20 carbon atoms, and $R_7$, a divalent group containing 1 to 10 carbon atoms.

Preferred $R_5$ groups are alkylene or alkenylene groups containing 1 to 20 carbon atoms, cyclohexanediyl, phenylene, tolylene, xylylene, naphthylene, and biphenylylene. Preferred $R_6$ groups are alkylene or alkenylene groups containing 1 to 20 carbon atoms, cyclohexanedi-yl, phenylene, tolylene, xylylene, naphthylene, and biphenylylene. Preferred $R_7$ groups are alkylene groups containing 1 to 10 carbon atoms, carboxy substituted alkylene groups containing 1 to 10 carbon atoms, and phenyl substituted alkylene groups containing 1 to 10 carbon atoms. $R_8$ preferably represents an alkylene group containing 1 to 20 carbon atoms, examples of which are the same as those set forth for $R_6$.

The dicarboxylic acids in (D) above may be in the anhydride or ester form and the amino acids in (E) may be in the anhydride form.

Examples of the diamines in (D) are methylene diamine, dimethylene diamine, trimethylene diamine, tetramethylene diamine, pentamethylene diamine, hexamethylene diamine, heptamethylene diamine, octamethylene diamine, nonamethylene diamine, decamethylene diamine, piperazine, diaminocyclohexane, di(aminomethyl)cyclohexane, bis-(4-aminocyclohexyl)methane, bis-(4-amino-1,2-methylcyclohexyl)methane, o-phenylenediamine, m-phenylenediamine, p-phenylenediamine, 4,4'-diaminobiphenyl, tolylenediamine, xylylenediamine, and naphthylenediamine.

Examples of the dicarboxylic acids in (D) are malonic acid, succinic acid, glutaric acid, adipic acid, pimelic acid, suberic acid, azelaic acid, sebacic acid, nonanedicarboxylic acid, decanedicarboxylic acid, undecanedicarboxylic acid, dodecanedicarboxylic acid, hexadecanedicarboxylic acid, thapsic acid, japanic acid, maleic acid, fumaric acid, citraconic acid, diglycollic acid, malic acid, citric acid, phthalic acid, isophthalic acid, terephthalic acid, maleic anhydride, and phthalic anhydride.

The amino acids (aminocarboxylic acids) in (E) include, for example, $\alpha$-aminoacetic acid, L-$\alpha$-aminopropionic acid, L-$\alpha$-aminoisovaleric acid, $\epsilon$-aminocaproic acid, L-$\alpha$-aminoisocaproic acid, L-$\alpha$-amino-$\beta$-phenylpropionic acid, L-aminosuccinic acid (aspartic acid), L-$\alpha$-aminoglutaric acid (glutamic acid), $\gamma$-aminobutyric acid, $\alpha$-amino-n-adipic acid, 11-aminoundecanoic acid, $\alpha$-amino-DL-isoamylbutyric acid, $\alpha$-amino-n-butyric acid, 2-amino-2-methylbutyric acid, $\alpha$-aminocaprylic acid, α-aminocapric acid, 1-aminocyclohexanecarboxylic acid, α-aminocyclohexylacetic acid, 1-amino-α-methylcyclohexanecarboxylic acid, ethyl aminomalonate, β-benzyl-L-aspartate, β-benzyl D-aspartate, and γ-benzyl DL-glutamate.

Examples of the lactams in (F) are glycine anhydride, α-pyrrolidone, α-piperidone, γ-butyrolactam, γ-valerolactam, ε-caprolactam, α-methylcaprolactam, β-methylcaprolactam, γ-methylcaprolactam, δ-methylcaprolactam, ε-methylcaprolactam, N-methylcaprolactam, β,γ-dimethylcaprolactam, γ-ethylcaprolactam, γ-isopropylcaprolactam, ε-isopropylcaprolactam, γ-butylcaprolactam, ε-enantholactam, ω-enantholactam, η-caprylolactam, ω-caprylolactam, and ω-laurolactam.

These polyamides are commonly called nylons. Specific examples include nylon-2- obtained by polymerizing N-carboxyaminoacid anhydride, nylon-3 obtained by polymerizing β-aminopivalic acid, nylon-4 obtained by the ring-opening polymerization of α-pyrrolidone, nylon-5 obtained by the ring-opening polymerization of α-piperidone, nylon-6 obtained by the ring-opening polymerization of ε-caprolactam, nylon-7 obtained by the polymerization of ω-aminoenanthioic acid, nylon-8 obtained by the ring-opening polymerization of caprylolactam, nylon-9 from ω-aminononylic acid, nylon-10 obtained by the ring-opening polymerization of caprylolactam, nylon-11 from 11-aminoundecanoic acid, nylon-12 obtained by the ring-opening polymerization of ω-laurolactam, nylon-66 obtained by the polycondensation of hexamethylenediamine with adipic acid, and nylon-610 obtained by the polycondensation of hexamethylenediamine with sebacic acid. Co-polymers of these nylons, such as nylon 6/66/6,10 (co-polymerization ratio: 10/40/50) or nylon 66/6,10 (co-polymerization ratio: 45/55) can also be used.

The polyamide resins especially effective in the present invention are those which easily induce curing of the epoxy resins, and which are represented by the following general formula [IV]

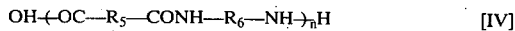

OH+(-OC—R$_5$—CONH—R$_6$—NH-)$_n$H    [IV]

wherein n is the degree of polymerization, and R$_5$ and R$_6$ are the same as in formula [II]

—(NH—R$_5$—NHCO—R$_6$—CO—)— in which the amount of the dicarboxylic acids is increased to leave the carboxyl group at the ends.

Copolymers of these nylons with other monomers can also be used. Typically, such other monomers will be present in an amount of from 0.3 to 10 mol %, when used. Specifically, they include, for example, graft copolymers with a vinyl monomer such as 2-methyl-5-vinyl pyridine, styrene, methyl methacrylate, sodium acrylate, vinyl acetate, vinylidene chloride or acrylonitrile; and copolymers with a ring-opening polymerizable monomer such as ethylene oxide, propylene oxide, ethyleneimine, cyclooxabutane, ε-caprolactam, ethylene sulfide, epichlorohydrin, maleic anhydride, phthalic anhydride, hexahydrophthalic anhydride, dichloromaleic anhydride, or dodecylsuccinic anhydride.

These copolymers can be prepared by conventional methods such as graft polymerization, acylation and alkylation.

These polyamide resins have a molecular weight of about 500 to about 10,000, preferably about 800 to about 7,000, and an amine equivalent of about 2 to about 400.

Useful commercially available polyamide resins are, for example, nylon 6 such as Amilan CM 1031 (trademark for a product of Toray Industries, Inc.), Ube Nylon EA 1030 (trademark for a product of Ube Industries), Glyron A1050 (trademark for a product of Unitika Limited), Plaskon 8211 and 8229 (trademarks for products of Allied Chemical Corp.), Spencer Nylon 607 (trademark for a product of Spencer Chemical Co., Ltd.), Foster Nylon BK40F and BK40T (trademarks for products of Foster Grant Co., Ltd.), Ultramide BKR1144/3 (trademark for a product of BASF A.G.), Durethan BK50F and BK64F (trademarks for products of Bayer A.G.), or Maranyl F160 and F170 (trademarks for products of ICI, Ltd.); nylon 66 such as Amilan CM3021 (trademark for a product of Toray Industries, Inc.), Zytel 42 (trademark for a product of E. I. du Pont de Nemours & Co.), Ultramide AKR 1183 (trademark for a product of BASF A.G.), Maranyl A150M and A100E (trademarks for products of ICI, Ltd.), or Nylatron GS (trademark for a product of Polymer Corp.); and nylon 610 such as Amilan CM2006 (trademark for a product of Toray Industries, Inc.), Zytel 38 (trademark for a product of E. I. du Pont de Nemours & Co.), Ultramide S4 and S4K (trademarks for products of BASF A.G.), and Maranyl B100 and B100C (trademarks for products of ICI, Ltd.).

Also, Tohmide (trademark for a product of Fuji Chemical Co., Ltd.), Hitamide (trademark for a product of Hitachi Chemical Co., Ltd.), and VARSAMIDE (trademark for a product of General Mills Inc.) can be used.

These polyamide resins and methods for their preparation are described, for example, in the Japanese publications, Lectures in Plastic Materials (16), "Polyamide Resins", edited by Osamu Fukumoto, published July 25, 1970 by Nikkal Kogyo Press, and "Synthetic Polymers V", pages 11 to 186, edited by Murahashi, Imoto and Tani, published June 15, 1971 by Asakura Shoten, and in U.S. Pat. Nos. 2,130,497; 2,130,523; 2,149,273; 2,158,064; 2,223,493; 2,249,627; 2,534,347; 2,540,352; 2,715,620; 2,756,221; 2,939,862; 2,994,693; 3,012,994; 3,133,956; 3,188,228; 3,193,475; 3,193,483; 3,197,443; 3,226,362; 3,242,134; 3,247,167; 3,299,009; 3,328,352; and 3,354,123.

Polyamideimide resins which are synthesized by methods similar to those for the preparation of the above polyamide resins can also be used in this invention; preferred polyamideimide resins have a molecular weight of about 500 to about 10,000, more preferably about 800 to about 7,000, and an amine equivalent of about 2 to about 400. Specifically, the polyamideimide resins can be obtained, for example, by a method comprising reacting low molecular weight amino-terminated polyamides (preferably having a molecular weight of from about 200 to about 500) with acid anhydrides or derivatives thereof, by a method comprising reacting low molecular weight amino-terminated polyamide acids with dibasic chlorides, or a method comprising reacting trimellitic acid derivatives with diamines.

Examples of the acid anhydrides or the derivatives thereof that can be used in the above methods include aryl or aromatic polycarboxylic acids, preferably having 2 to 4 carboxyl groups, for example pyromellitic anhydride, 1,4-dimethyl pyromellitate, tetramethyl pyromellitate, ethyl pyromellitate, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, and 2,2',6,6'-biphenyltetracarboxylic dianhydride. The diamines that can be used are the aromatic diamines illustrated hereinabove.

In the synthesis of the polyamide acids, dimethyl formamide, dimethyl acetamide, dimethylmethoxy acetamide, N-methyl caprolactam, dimethylsulfone, tetramethylene sulfone, and N-acetyl-2-pyrrolidone, etc., are used as a solvent. The amount of solvent is not overly important, and typically it is merely that necessary to dissolve the reactants.

The polyamideimide resins and methods for their preparation are described, for example, in G. M. Bower et al., "Journal of Polymer Science", A-1, page 3135 (1903), U.S. Pat. No. 2,421,024, British Pat. No. 570,858, French Pat. No. 386,617 and Belgian Pat. No. 650,979.

The polyurethane resins used in this invention include, for example, polyester-polyurethane resins or polyether-polyurethane resins prepared by urethanizing (A) polyester polyols synthesized by reacting organic dicarboxylic acids such as phthalic acid, adipic acid, dimerized linoleic acid, or maleic acid with glycols such as ethylene glycol, propylene glycol, butylene glycol, or diethylene glycol, polyhydric alcohols such as trimethylol propane, hexanetriol, glycerin, trimethylol propane, hexanetriol, trimethylol ethane or pentaerythritol, or with any of the above and glycols and/or polyhydric alcohols; lactone type polyester polyols synthesized from ε-caprolactam, α-methyl-ε-caprolactam, ε-methyl-caprolactam, or butyrolactam; or polyether polyols prepared from ethylene oxide, propylene oxide or butylene oxide; with (B) diisocyanate compounds such as tolylene diisocyanate, 4,4'-diphenylmethane diisocyanate, hexamethylene diisocyanate or m-xylylene diisocyanate.

These polyurethane resins have a molecular weight of 5,000 to 200,000, preferably 10,000 to 100,000.

These polyurethane resins are described, for example, in the Japanese publication, "Synthetic Polymers V", pages 309 to 363, edited by Murahashi, Imoto and Tani, published June 15, 1971 by Asakura Shoten, and in U.S. Pat. Nos. 2,409,712; 2,424,884; 2,642,449; 2,660,575; 2,680,127; 2,691,566; 2,691,567; 2,713,591; 2,757,183; 2,875,225; and 3,070,618.

Blocked polyisocyanates as are used in the present invention are also called masked polyisocyanates or isocyanate generators, and contain a suitable functional group (blocking group) attached to the isocyanate groups so that the high reactivity of the isocyanate groups is blocked at low temperatures. At temperatures above a certain limit (determined by the attached functional compound), that is, by heating, the attached group is liberated, and, consequently, the thermoplasticity of the binder is reduced to impart heat curability thereto. Since this liberating reaction later promotes the generation of the active isocyanate groups, the above cross-linking reaction can be completed by heating for a very short period of time. When the blocked polyisocyanate is used as a component of the binder in the present invention, the liberation of the blocked polyisocyanate does not occur unless heating is performed. For this reason, the blocked polyisocyanate is kept inert, and the binder composition used in this invention has excellent storage stability and is stable in the form of a magnetic coating composition. Heating and drying of the coated composition afford a magnetic recording layer of good quality.

Blocking agents and methods for introducing the same are discussed in detail in British Pat. No. 718,822; German Pat. No. 929,277; O. Bayer, *Angewandte Chemie* 59, 257 (1947); S. Petersen, *Annalen der Chemie* 562, 205 (1949); W. Otting et al., *Annalen der Chemie* 622, 23 (1959); G. R. Griffin et al. *IEC Product Research and Development* 1, 265 (1962). Examples of the blocking agent are phenols such as phenol, 2,4-diisobutyl phenol, iso-octyl phenol, cresol, xylenol, or 4-hydroxybiphenol; oximes such as acetoneoxime, methyl ethyl ketone oxime, or cyclohexanone oxime; alcohols such as isopropyl alcohol, sec-butyl alcohol, caprylyl alcohol, tert-butyl alcohol, tert-octyl alcohol, methyl lactate, or ethyl lactate; cellosolves (ethylene glycol ethers) such as methyl cellosolve, ethyl cellosolve, isopropyl cellosolve, n-butyl cellosolve, or phenyl cellosolve; mercaptans such as ethyl mercaptan, isopropyl mercaptan, tert-butyl mercaptan, heptyl mercaptan, or phenyl mercaptan; amines such as hydroxylamine or diphenylamine, secondary amines such as methyl aniline, ethyl aniline or butyl aniline; amides such as acetamide, benzamide or benzoic acid amide, imides such as maleimide or phthalimide; lactams such as caprolactam or α-pyrrolidone; active hydrogen compounds such as acetylacetone, malonic acid esters, preferably alkyl esters having 1 to 4 carbon atoms, or acetoacetic acid esters; alkali metal sulfites such as sodium sulfite, sodium pyrosulfite, or potassium metabisulfite; prussic acid; and pyrocatechol, acetonoxime, and 6-hydroxytetralin.

The polyisocyanate to be blocked includes isocyanates containing at least 2 isocyanate groups, preferably 2 to 6 isocyanate groups, and more preferably 2 to 4 isocyanate groups, and their adducts, examples of which are aliphatic diisocyanates, aliphatic diisocyanates containing a cyclic group, aromatic isocyanates, naphthalene isocyanates, biphenyl isocyanate, diphenylmethane diisocyanate, triphenylmethane diisocyanate, triisocyanates, tetraisocyanates, and adducts thereof.

Specific examples of the polyisocyanates are isocyanates such as ethane diisocyanate, butane diisocyanate, hexane diisocyanate, 2,2-dimethylpentane diisocyanate, 2,2,4-trimethylpentane diisocyanate, decane diisocyanate, ω,ω'-diisocyanato-1,3-dimethylbenzol, ω,ω'-diisocyanato-1,2-dimethylcyclohexane diisocyanate, ω,ω'-diisocyanato-1,4-diethylbenzol, ω,ω'-diisocyanato-1,5-dimethylnaphtalene, ω,ω'-diisocyanato-n-propyl biphenyl, 1,3-phenylene diisocyanate, 1-methylbenzol-2,4-diisocyanate, 1,3-dimethylbenzol-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzol-2,4,6-triisocyanate, 1,3,5-trimethylbenzol-2,4,6-triisocyanate, diphenylmethane-2,4,4'-triisocyanate, triphenylmethane-4,4',4''-triisocyanate, tolylene diisocyanate, or 1,5-naphthylene diisocyanate; adducts of dimers or trimers of these isocyanates; and adducts formed between these isocyanates and dihydric or trihydric alcohols. The adducts include, for example, an adduct of tolylene diisocyanate and trimethylol propane, an adduct of 3 moles of tolylene diisocyanate, an adduct of 3 moles of hexamethylene diisocyanate, and an adduct of 2 moles of hexamethylene diisocyanate. Adducts of isocyanates selected optionally from the above group can also be used.

Of these, adducts of isocyanates and phenols are most typical, and are commercially available, for example, as Coronate AP Stable and Millionate MS-50 from Nippon Polyurethane Company. Coronate AP Stable is a blocked polyisocyanate obtained by reacting 3 moles of tolylene diisocyanate with 1 mole of trimethylol propane, and blocking the isocyanato with phenol. Millionate MS-50 is a blocked polyisocyanate obtained by blocking diphenylmethane diisocyanate with cresylic acid.

Polyaziridines obtained by reacting the isocyanates with ethyleneimine can also be used together with the blocked polyisocyanates; preferred polyaziridines are those having 2 or 3 aziridine groups. Specific examples of the polyaziridines are:

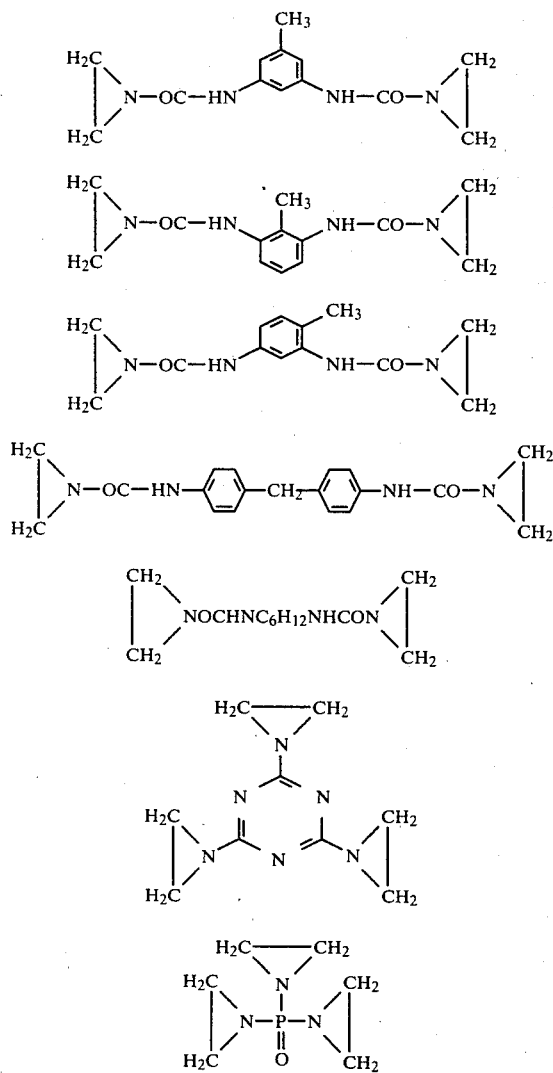

These polyaziridines are added in an amount of about 0.1 to about 20% by weight based on the weight of the blocked polyisocyanate.

The blocked polyisocyanates and methods for their production are described, for example, in the Japanese publication "Synthetic Polymers V", pages 332 to 343, edited by Murahashi, Imoto and Tani, published June 15, 1971 by Asakura Shoten, O. Bayer, "*Angewandte Chemie*", 59, 257 (1947), S. Peterson, "*Annalen der Chemie*", 562, 205 (1949), W. Otting et al., "*Annalen der Chemie*", 622, 23 (1959), West German Pat. No. 929,277 and British Pat. No. 718,822.

In order to emulsify the above-described binder components in water, an emulsifier is used as required. Usually, surface active agents are used as the emulsifier. The surfactants not only exhibit an effect of emulsifying the binder components to prevent their reaction, but also serve as a dispersing agent for the ferromagnetic powder added and as an antistatic agent for the magnetic recording layer.

Any anionic, cationic, amphoteric and nonionic surfactant can be used, either alone or in admixture. Examples of effective surfactants include anionic surfactants such as fatty acid salts, alkyl sulfate ester salts, higher alcohol sulfate ester salts, alkylphosphate ester salts, alkylsulfonate ester salts, alkylarylsulfate ester salts, alkylarylsulfonate ester salts, formaldehyde condensed naphthalenesulfonate ester salts, alkyldiphenyl ether disulfonate ester salts, or dialkylsulfosuccinate ester salts; cationic surfactants such as fatty acid amine salts, quaternary ammonium salts, or alkyl pyridinium salts; and amphoteric and nonionic surfactants such as polyoxyethylene alkyl ethers and their sulfate ester salts, polyoxyethylene alkylaryl ethers and their sulfate ester salts, polyoxyethylene alkyl esters and their sulfate ester salts, sorbitan fatty acid esters, or polyoxyethylene sorbitan fatty acid esters. Specific examples of these surfactants are listed below.

Fatty acid salts

Sodium myristate, sodium palmitate, sodium stearate, sodium oleate, sodium linolate, sodium laurate, sodium caproate, potassium laurate, and potassium stearate.

Alkyl sulfate ester salts

Sodium octadecyl sulfate, sodium decyl sulfate, sodium dodecyl sulfate, sodium tetradecyl sulfate, sodium hexadecyl sulfate, potassium decyl sulfate, and potassium oleyl sulfate.

Higher alcohol sulfate ester salts

Stearyl alcohol sulfate, cetyl alcohol sodium sulfate, myristyl alcohol potassium sulfate, lauryl alcohol sulfate, lauryl alcohol ammonium sulfate, decyl alcohol triethanolamine sulfate, octyl alcohol calcium sulfate, cetyl alcohol magnesium sulfate, and decyl alcohol ammonium sulfate.

Alkyl phosphate ester salts

Sodium octyl phosphate, sodium dioctyl phosphate, sodium nonyl phosphate, sodium decyl phosphate, potassium undecyl phosphate, potassium dodecyl phosphate, and potassium pentadecyl phosphate.

Alkyl sulfonate ester salts

Sodium dodecyl sulfonate, sodium hexadecyl sulfonate, and sodium octadecyle sulfonate.

Alkyl aryl sulfonate ester salts

Potassium octyl benzenesulfonate, sodium nonyl benzenesulfonate, sodium decyl benzenesulfonate, sodium undecylbenzenesulfonate, sodium dodecyl benzenesulfonate, sodium tridecyl benzenesulfonate, sodium dibutyl naphthalenesulfonate, sodium decyl naphthalenesulfonate, sodium octyl naphthalenesulfonate, and potassium pentyl naphthalenesulfonate.

Formaldehyde condensed alkyl naphthalenesulfonate ester salts

Formaldehyde condensed sodium ethylnaphthalenesulfonate, and formaldehyde condensed sodium butylnaphthalenesulfonate.

Alkyl diphenyl ether sulfonate ester salts

Sodium nonyl diphenyl ether sulfonate, sodium decyl diphenyl ether sulfonate, and sodium dodecyl diphenyl ether disulfonate.

Dialkylsulfosuccinate ester salts

Sodium dihexyl sulfosuccinate, sodium dioctyl sulfosuccinate, and sodium dinonyl sulfosuccinate.

Fatty acid amine salts

Dodecyl amine acetate, stearyl amine acetate, n-dodecyl amine hydrochloride, n-octyl amine hydrochloride, n-decyl amine hydrochloride, n-tetradecyl amine hydrochloride, n-hexamethyl amine hydrochloride, n-octadecyl amine hydrochloride, dodecyl amine nitrate, and octadecyl trimethyl amine hydrochloride.

Quaternary ammonium salts

Decyltrimethylammonium chloride, dodecyltrimethylammonium chloride, cetyltrimethylammonium chloride, tetradecyltrimethylammonium chloride, decyltrimethylammonium bromide, hexadecyltrimethylammonium bromide, dioctyldimethylammonium chloride, dodecyldimethylammonium chloride, octyldodecyldimethylammonium chloride, didodecyldimethylammonium chloride, benzylmethylhexylammonium chloride, benzylmethyldecylammonium chloride, benzyldimethyldodecylammonium chloride, 4-nitrobenzylmethyloctylammonium chloride, 2-chlorobenzyldimethyldodecylammonium chloride, 2,4-dichlorobenzyldimethyldodecylammonium chloride, 2-hydroxy-5-nitrobenzyldimethyldodecylammonium chloride, 3,4-dimethoxybenzyldimethyldodecylammonium chloride, octyltrimethylammonium octanesulfonate, and octyltrimethylammonium decanesulfonate.

Alkyl pyridinium salts n-Dodecyl pyridinium chloride, n-tetradecyl pyridinium chloride, n-hexadecyl pyridinium chloride and n-hexadecyl pyridinium chloride.

Polyoxyethylene alkyl ethers and the sulfate ester salts thereof

Polyoxyethylene lauryl ether, polyoxyethylene oleyl ether, sodium polyoxyethylene lauryl ether sulfate, sodium polyoxyethylene oleyl ether sulfate, polyoxyethylene dodecyl ether, polyoxyethylene tetradecyl ether, polyoxyethylene hexadecyl ether, polyoxyethylene octadecyl ether, and polyoxyethylene cetyl ether.

Polyoxyethylene alkylaryl ethers and the sulfate ester salts thereof

Sodium polyoxyethylene nonylphenyl ether sulfate, polyoxyethylene nonylphenyl ether, and sodium polyoxyethylene dibutylphenyl ether sulfate.

Polyoxyethylene fatty acid esters and the sulfate ester salts thereof

Polyoxyethylene stearate, polyoxyethylene palmitate, sodium polyoxyethylene stearate sulfate, sodium polyoxyethylene laurate sulfate, sodium polyoxyethylene caprate sulfate, and sodium polyoxyethylene myristate sulfate.

Sorbitan fatty acid esters

Sorbitan monolaurate, sorbitan monopalmitate, sorbitan monostearate, sorbitan tristearate, sorbitan monooleate, and sodium sorbitan trioleate.

Polyoxyethylene sorbitan fatty acid esters

Polyoxyethylene sorbitan monolaurate, polyoxyethylene sorbitan monostearate, polyoxyethylene monooleate, polyoxyethylene sorbitan monopalmitate, and polyoxyethylene trioleate.

Other surfactants

Polyoxyethylene mannitol monolaurate.

The amount of the binder emulsified in water in the present invention is about 10 to about 70%, preferably 30 to 50%, by weight as solids, based on the total system weight. The binder components in the form of an aqueous emulsion are, of course, polymers having functional groups. Assuming two binders are utilized, the molar ratio of the functional groups of binder A/binder B is about 35/65 to 65/35, more preferably substantially 50/50. In those instances wherein binder B comprises a thermoplastic resin and a thermosetting resin, for example, the amount of thermoplastic resin is about 0 to 15 weight % based on the total amount of resin.

When the amount of the binder is too small, a large quantity of an emulsion is required in order to obtain an effective amount of binder, and dispersion of the ferromagnetic powder cannot be effectively performed. Furthermore, when the amount of the binder component becomes too large, difficulty is experienced in the preparation of emulsions. Accordingly, amounts within the above range are suitable and effective.

The emulsification can be carried out using general techniques, such as shaking, stirring, leaking, injection, application of ultrasonic waves, colloid milling, or high pressure jetting or a combination thereof. These methods are described, for example, in "Emulsion Science", edited by P. Sherman, 1968, and published in 1968 by Academic Press Inc., London. Most preferred results are obtained in accordance with the present invention when the binders are emulsified so as to have a size of from about 0.01 to about 5 $\mu$m, even more preferably 0.05 to 2 $\mu$m.

As resin components which do not directly contribute to the reaction, there can be used emulsions of, for example, a vinyl chloride/vinyl acetate copolymer, a vinyl chloride/vinylidene chloride copolymer, a vinyl chloride/acrylonitrile copolymer, an acrylate ester/acrylonitrile copolymer, an acrylate ester/vinylidene chloride copolymer, an acrylate ester/styrene copolymer, a methacrylate ester/vinylidene chloride copolymer, a methacrylate ester/styrene copolymer, a urethane elastomer, a polyamide resin, a silicone resin, a cellulose derivative, polyvinyl fluoride, a vinylidene chloride/acrylonitrile copolymer, a butadiene/acrylonitrile copolymer, polyvinyl butyral, a styrene/butadiene copolymer, a polyester resin, a chlorovinyl ether acrylate ester copolymer, an amide resin, or a synthetic rubber. Typically, such resin components which do not directly contribute to the reaction will be used in an amount of from 0 to about 30 wt %, based on the total weight of the binder components.

As the ferromagnetic power, there can be used $\gamma$-$Fe_2O_3$, Co-containing $\gamma$-$Fe_2O_3$, $Fe_3O_4$, Co-containing Fe$_3$O$_4$, a Berthollide compound having a formula between $\gamma$-Fe$_2$O$_3$ and Fe$_3$O$_4$ (FeO$_x$, $1.33<x<1.50$), a Berthollide compound of Co-containing $\gamma$-Fe$_2$O$_3$ and Fe$_3$O$_4$ (FeO$_x$, $1.33<x<1.50$), CrO$_2$, Co-Ni-P alloy, Co-Ni-Fe alloy, Co-Ni-Fe-B alloy, Fe-Ni-Zn alloy, Fe-Mn-Zn alloy, Fe-Co-Ni-P alloy, Ni-Co alloy, etc., which are known in the art. These ferromagnetic materials are specifically disclosed, for example, in Japanese Patent Publications Nos. 14090/69, 18372/70, 22062/72, 22513/72, 28466/71, 38755/71, 4286/72, 12422/72, 17284/72, 18509/72, 18573/72, 5009/64, 10307/64, and 39639/73, in U.S. Pat. Nos. 3,026,215; 3,031,341; 3,100,194; 3,242,005; and 3,389,014, in British Pat. Nos. 752,659; 782,762; and 1,007,323, in French Pat. No. 1,107,654, and West German Patent Publication (OLS) No. 1,281,334.

The particle size of these ferromagnetic fine powders is such that their length is about 0.2 to about 1 micron, and their length-to-width ratio is about 1/1 to about 20/1.

The proportion of the binder is generally about 17 to about 100 parts by weight, as dry weight, per 100 parts by weight of the ferromagnetic powder. Proportions of 20 to 70 parts by weight are commercially preferred, and proportions of 25 to 40 parts are especially preferred.

When the amount of the binder is too small, an effective magnetic recording layer cannot be formed. On the other hand, when the amount of the binder is too large, the packing ratio of the magnetic particles might be too small to permit effective magnetic recording. Thus, the proportions of the binder outside the specified range are not preferred.

For most commercially desirable products, the thickness of a magnetic recording layer in accordance with the present invention will be from about 1 to about 20 $\mu$m, even more preferably and generally, 2 to 10 $\mu$m.

Conventional additives can be added to the magnetic recording layer, such as lubricants, abrasives, or antistatic agents, by adding them to a magnetic coating composition of the aqueous emulsion type.

Examples of the lubricants are silicone oils, carbon black, graphite, carbon black graft polymers, polyvinyl chloride, polystyrene, polyethylene, polypropylene, molybdenum disulfide, tungsten disulfide, fatty acid esters formed between monobasic fatty acids containing 12 to 16 carbon atoms and monohydric alcohols containing 3 to 12 carbon atoms, and fatty acid esters formed between monobasic fatty acids containing at least 17 carbon atoms and monohydric alcohols (with the number of carbons being 21 to 23 as a sum total, including the carbon atoms of the monobasic fatty acid(s)).

When used, a lubricant is generally added in an amount of 0.2 to 20 parts by weight per 100 parts by weight of the binder.

These lubricants are described, for example, in Japanese Patent Publication No. 23889/68, Japanese Patent Applications Nos. 28647/67 and 81543/68, U.S. Pat. Nos. 3,470,021; 3,492,235; 3,497,411; 3,523,086; 3,625,760; 3,630,772; 3,634,253; 3,642,539; and 3,687,725, "IBM Technical Disclosure Bulletin", Vol. 9, No. 7, page 779 (December 1966), and "Electronik", 1961, No. 12, page 380.

The abrasives are also conventional and include, for example, fused alumina, silicon carbide, chromic oxide, corundum, artificial corundum, diamond, artificial diamond, garnet, and emery (main components: corundum and magnetite). The average particle size of the abrasive is 0.05 to 5 microns, preferably 0.1 to 2 microns.

When used, the abrasives are used in an amount of 7 to 20 parts by weight per 100 parts by weight of the binder.

These abrasives are described, for example, in Japanese Patent Application No. 26749/73, U.S. Pat. Nos. 3,007,807; 3,041,196; 3,293,066; 3,630,910; and 3,687,725, British Pat. No. 1,145,349, and West German Pat. No. 853,211.

Examples of the antistatic agent are electrically conductive powders such as graphite or carbon black. The amount of the antistatic agent, when used, is about 5 parts by weight per 100 parts by weight of the ferromagnetic powder.

These antistatic agents are described, for example, in Japanese Patent Publications Nos. 2613/65, 24881/72, 15440/73, and 3642/75, U.S. Pat. Nos. 2,804,401, 3,293,066, and 3,647,539, British Pat. No. 793,520, and "IBM Technical Disclosure Bulletin", Vol. 6, No. 12, page 4 (May 1964).

In order to disperse the ferromagnetic powder into the binder, conventional methods are utilized. For example, ball milling, vibratory milling, sand milling, colloid milling and combinations thereof these can be used. In some cases, ultrasonic vibration can be jointly used therewith. Various types of kneaders can be used in performing the dispersion. Examples include a two-roll mill, a three-roll mill, a ball mill, a pebble mill, a trommel, a sand grinder, a Szegvari attriter, a high-speed impeller, a high-speed stone mill, a high-speed impact mill, disperser, kneader, an high-speed mixer, a homogenizer, and an ultrasonic dispersing apparatus.

Various useful techniques relating to kneading and dispersing are described in T. C. Patton, "Paint Flow and Pigment Dispersion", 1964, John Wiley & Sons, and in U.S. Pat. Nos. 2,581,414 and 2,855,156.

The magnetic coating liquid of the aqueous emulsion type having the above-described composition is coated on a non-magnetic support to form a magnetic recording layer.

Useful materials for the support are conventional and include polyesters such as polyethylene terephthalate, or polyethylene-2,6-naphthalate, polyolefins such as polyethylene or polypropylene, cellulose derivatives such as cellulose triacetate, cellulose diacetate or cellulose acetate butyrate, plastics such as polycarbonate, polyvinyl chloride, polyamides or polyimides, non-magnetic metals such as copper, aluminum or zinc, and ceramic materials such as glass, porcelain or earthenware.

The thickness of the non-magnetic support is about 3 to about 100 $\mu$m in the case of a film or sheet, and about 0.5 to 10 mm in the case of a disc or card. In the case of a drum form, the material is made into a cylindrical shape and its specific thickness is determined according to the recorder used.

The nonmagnetic support, in the form of a film, sheet, disc or card, may be back-coated at the surface opposite to the magnetic layer in order to prevent static charge and recording transfer, if desired. Useful back-coating techniques are disclosed, for example, in Japanese Patent Publication Nos. 24041/73, 8321/74, and 10241/74, and in U.S. Pat. Nos. 2,804,401; 3,293,066; 3,617,378; 3,062,676; 3,734,772; 3,476,596; 2,643,048; 2,803,556; 2,887,462; 2,923,642; 2,997,451; 3,007,892; 3,041,196; 3,115,420; and 3,166,688.

The coating of the magnetic recording layer on the support can be performed by conventional methods, for example, air doctor coating, blade coating, air knife coating, squeeze coating, dip coating, reverse roll coating, transfer roll coating, gravure coating, kiss coating, cast coating, or spray coating. Other methods are also useful, and description relative thereto is given in detail in the Japanese language publication, "Coating Engineering", pages 253 to 277, published Mar. 20, 1971 by Asakura Shoten.

The magnetic layer coated on the support in this manner can be subjected, if desired, to an orientation treatment for the magnetic powder in the layer, and the resulting magnetic layer dried. As required, it can be subjected to a surface smoothening treatment, or cut into any desired shape to form a magnetic recording material of this invention.

The orientation magnetic field used in this case can be alternate or direct current of about 500 to 2,000 gauss. The drying temperature is about 50° to 100° C., and the drying time is about 3 to 10 minutes.

Useful methods of orienting the magnetic powder are described, for example, in U.S. Pat. Nos. 1,949,840; 2,796,359; 3,001,891; 3,172,776; 3,416,949; 3,473,960; and 3,681,138, and in Japanese Patent Publication Nos. 3427/57, 28368/64, 23624/65, 23625/65, 13181/66, 13043/73, and 39722/73.

The direction in which the magnetic powder is oriented is determined according to the use of the resulting magnetic recording material. In the case of a sound tape, a small sized video tape, or a memory tape, it is parallel to the lengthwise direction of the tape. In the case of a broadcasting video tape, the orienting direction is inclined by an angle of 30° to 90° to the lengthwise direction of the tape.

Techniques for surface smoothening include, for example, shaping the surface by a super calender, planing the surface by a metal brush, a synthetic fiber brush, or a natural fiber brush, and abrading the surface with an abrasive sheet or the like. These techniques can all be utilized in the present invention.

A wide magnetic tape so surface treated can be slit to the desired tape width depending on the intended use, for example, to a width of 2 inches, ¾ inch, ½ inch, ¼ inch, or 3.81 mm, or cut or punched into magnetic sheets of various sizes and shapes, such as rectangular, square or circular.

Since the process of this invention provides a magnetic recording layer by coating the novel magnetic coating composition of the aqueous emulsion type prepared using an aqueous emulsion type binder and curing it by reaction or heating after coating, a magnetic recording material having superior abrasion resistance and thermal stability, which does not cause pollution, can be obtained without using an organic solvent.

The following Examples illustrate the present invention more specifically. It will be readily understood by those skilled in the art that the components, proportions, operational sequences, etc., described therein can be changed without departing from the spirit and scope of the present invention. Accordingly, the invention is not to be limited to the following Examples.

EXAMPLE 1

An epoxy resin (the reaction product formed between epichlorohydrin and diphenyl propane; average molecular weight 350; epoxy group content 0.52) as a first binder component was emulsified and dispersed (aqueous emulsion particle size: 0.5 μm) in water using polyoxyethylene oleyl ether (emulsifier; nonionic surface active agent) so that the resin solids content was 43% by weight to form an emulsion. To 100 g of this emulsion were added 300 g of maghemite ($\gamma$-Fe$_2$O$_3$) (average particle length: 0.5 μm, acicular ratio: 10/1, Hc: 270θe) and 0.79 g of polydimethyl siloxane (polymerization degree of about 60; hereafter any siloxane had a polymerization degree of about 60 unless otherwise indicated), and they were thoroughly dispersed together with 500 g of distilled water in a ball mill to form a magnetic coating composition pre-product (aqueous emulsion particle size: 1 μm).

A polyamide resin [H$_2$N$-$($-$CH$_2$$-$CH$_2$$-$NH)$-$$\overline{m}$(OC$-$R$-$CONH$-$(CH$_2$$-$CH$_2$$-$NH)$\overline{m}$)$\overline{n}$H in which R was an alkylene group of the following formula with 34 carbon atoms

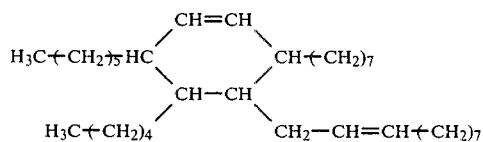

and in which m=3 and n=8; amine value 250] as a second binder component was emulsified and dispersed in water using polyoxyethylene oleyl ether (aqueous emulsion particle size: 1 μm) so that the resin solids content was 30% by weight. 150 g of the resulting emulsion and 5 g of a water soluble melamine resin [viscosity (50% by weight aqueous solution, 20° C.) 5 poises; pH 7.5; specific gravity 1.1] were added to the earlier described pre-product to form an aqueous emulsion type magnetic coating composition (aqueous emulsion particle size: 1.5 μm).

The resulting magnetic coating composition was coated to a dry thickness of 10 μm on a 25 μm-thick polyethylene terephthalate film which had earlier been subjected to a conventional vacuum glow discharge treatment, and dried at 100° C. for 3 minutes. The resulting magnetic recording composition was thereafter cured at 30° C. for 120 hours. The surface of the resulting product was then calendered at 80° C. to form a wide magnetic tape. The tape was punched into a circular shape with a diameter of 20 cm to form a magnetic sheet. The resulting magnetic sheet was tested for durability on a video sheet recorder. The results are shown in Table 1. It had good characteristics as a video sheet.

TABLE 1

| Measuring Conditions | Durability |
|---|---|
| 25° C., 40% RH | 300 hours |
| 40° C., 80% RH | 120 hours |

EXAMPLE 2

An acrylic resin (a terpolymer of butyl acrylate and acrylonitrile in a weight ratio of 8:2 with acrylic acid further copolymerized so that the carboxyl content became 1.2% by weight; degree of polymerization about 1,000) as a first binder component was emulsified and dispersed (aqueous emulsion particle size: 1 μm) using lauryl alcohol sulfate (emulsifier, anionic surface active agent) so that the resin solids content was 38% by weight. 120 g of the resulting emulsion, 300 g of Co-containing Berthollide iron oxide (FeO$_x$, 1.33<x<1.5; Co: 0.5 atomic % doped, average particle length: 0.6 μm; acicular ratio: 10/1; Hc: 450θe), 2 g of amyl stearate and 500 g of distilled water were thoroughly dispersed in a ball mill to form a coating composition pre-product (aqueous emulsion particle size: 1.5 μm).

A polyamide resin [H$_2$N-(-CH$_2$—CH$_2$—NH)-$\overline{m}$[OC—R—CONH—CH$_2$—CH$_2$—NH)$\overline{m}$]$\overline{n}$H wherein R was an alkylene group of the following formula with 34 carbon atoms

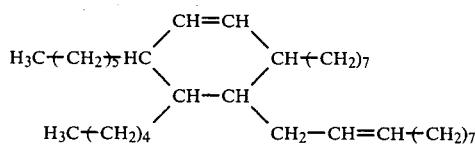

in which m=2 and n=12; amine value 300] as a second binder component was emulsified and dispersed in water using lauryl alcohol sulfate (aqueous emulsion particle size: 1.5 μm) so that the resin solids content was 40% by weight. 100 g of the resulting emulsion was added to the pre-product to form an aqueous emulsion type magnetic coating composition (aqueous emulsion particle size: 2 μm).

A 20 μm thick aromatic polyamide film was first subjected to a conventional corona discharge treatment. The magnetic coating composition was then coated on this polyamide film to a dry thickness of 10 μm, and dried at 100° C. for 3 minutes. It was further cured in an oven at 75° C. for 20 hours, and then supercalendered at 85° C. The resulting wide tape was slit to a size of ½ inch to form a tape for use in a data recorder. Its durability was tested by allowing it to run 1,000 times repeatedly at a velocity of 60 inches/sec. No deterioration was seen to occur in the tape; it thus has good durability.

EXAMPLE 3

As a first binder component, the same magnetic coating composition pre-product as was used in Example 2 was used.

A blocked polyisocyanate(2,4-tolylene diisocyanate blocked with phenol) as a second binder component was emulsified and dispersed in water using lauryl alcohol sulfate (aqueous emulsion particle size: 0.5 μm) so that the resin solids content was 40% by weight. 100 g of the resulting emulsion was added to the pre-product to form an aqueous emulsion type magnetic coating composition (aqueous emulsion particle size: 1.5 μm).

The resulting magnetic coating composition was coated by spraying to a dry thickness of 12 μm on a doughnut-shaped aluminum plate 1.5 mm thick and 350 mm in diameter which had been cleaned in a conventional manner with hot sodium hydroxide. The coated product was dried in hot air at 105° C. for 3 minutes, and then heated for 15 minutes in an infrared oven at 140° C. to react the acrylic resin of the first component with the isocyanate component of the second component.

In order to render the coated surface smoother, it was abraded using a 10,000-mesh abrasive to form a magnetic disc. A magnetic disc cartridge made by incorporating this disc in a disc pack had the property of sufficient floating.

EXAMPLE 4

A vinyl chloride/vinyl acetate copolymer (copolymerization ratio 85/15 weight %; OH content 3% by weight) as a first binder component was emulsified and dispersed in water (aqueous emulsion particle size: 0.5 μm) using polyoxyethylene cetyl ether (emulsifier, nonionic surface active agent) so that the resin solids content was 20% by weight. 150 g of the resulting emulsion, 300 g of a ferromagnetic powder of Fe-Co-Ni alloy (Fe-Co-Ni: 85-10-5 atomic%; average grain size: 300 Å; average grain chain length: 10; Hc: 1000θe), 2 g of sodium oleate, 0.8 g of a fluorine oil (trifluorochloroethylene) and 500 g of distilled water were thoroughly mixed and dispersed in a vibratory mill to form a magnetic coating composition pre-product (aqueous emulsion particle size: 1 μm).

40 g, as solids content, of a polyester-polyol [a terpolymer of adipic acid, diethylene glycol and trimethylol propane in a molar ratio of 1:1:0.05; viscosity (75° C.):1000 centipoises] as a second binder component, and 25 g, as solids content, of a blocked polyisocyanate (2,4-tolylene diisocyanate blocked with phenol) were added to the first component (pre-product) to form as aqueous emulsion type magnetic coating composition (aqueous emulsion particle size: 1.5 μm).

The magnetic coating composition was coated to a dry thickness of 8 μm on a 36 μm-thick polyethylene-2,6-naphthalate film and dried at 105° C. for 3 minutes. The surface was then calendered at 85° C. The coated product was then exposed in a far infrared oven to cross-link the binder components of the magnetic layer at 140° C. for 8 hours. The magnetic layer obtained was not easily dissolved by organic solvents (butyl acetate).

The resulting wide magnetic tape was slit to a size of ¼ inch. Its characteristics as an audio tape were measured, and found to be fully satisfactory both in regard to magnetic chracteristics and mechanical characteristics.

EXAMPLE 5

An audio tape with a width of 1.4 inch was produced in the same way as in Example 4 except that a methylol-containing butylated melamine resin (an amino resin with a viscosity, measured at 20° C. in a 50% by weight solution in xylol/butanol (1:1), of 30 poises, and an acid value of 0.3) was used instead of the polyester-polyol used in Example 4 as the second binder component. The thus obtained aqueous emulsion-type magnetic coating composition comprise emulsified binder particles of a size of 2 μm. The audio tape obtained had the same characteristics as the tape obtained in Example 4.

EXAMPLE 6

An aqueous emulsion (with an emulsion particle diameter of 0.1 μm) of a vinyl chloride/vinylidene chloride copolymer (copolymerization ratio 30:70; degree of polymerization: 600) obtained by emulsion polymerization so that the solids content was 30% by weight was used as a first binder component. 20 g, as solids content, of this aqueous emulsion, 300 g of maghemite (γ-Fe$_2$O$_3$; same as was used in Example 1), 0.7 g of polydimethyl siloxane, 2 g of oleic acid and 500 g of distilled water were dispersed in a ball mill to form a coating composition pre-product (aqueous emulsion particle size: 1.5 μm).

40 g, as solids content, of the same epoxy resin emulsion as was used in Example 1 and 30 g, as solids content, of the same blocked polyisocyanate emulsion as was used in Example 4 were added to the pre-product to form an aqueous emulsion type magnetic coating composition (aqueous emulsion particle size: 2 μm).

The resulting magnetic coating composition was coated on a 75 μm thick polyethylene terephthalate film to a dry thickness of 4 μm and dried at 105° C. for 3 minutes. The coated product was heated by passing it through chromium-plated metallic calender rolls, and punched into a flexible floppy disc sheet. The sheet was then heated in an oven at 105° C. for 15 hours to react the binder components to form a magnetic recording sheet which was set in a floppy jacket for flexible disc sheets and tested for durability. It was found that the sheet had a durability of more than 150 hours, and the durability was sufficient for its proper functioning.

EXAMPLE 7

An aqueous emulsion-type magnetic coating composition (aqueous emulsion particle size: 1.5 μm) was prepared in the same way as in Example 6 using a phenolic resin (the reaction product formed between 1 mole of p-tert-butyl phenol and 1.5 moles of formaldehyde; molecular weight of 2000) as a first binder component and a blocked polyisocyanate (the reaction product between butanol and 2,4-tolylene diisocyanate) as a second binder component and polyoxyethylene oleyl ether as an emulsifier. The ratio of the solids content of the phenolic resin to that of the blocked polyisocyanate was adjusted to 7:3 by wt., and the ratio of the solids content of these binder resins to that of the ferromagnetic powder was adjusted to 1:2 by wt.

A flexible floppy disc was made in the same way as in Example 6. It had a durability of more than 120 hours, which durability was sufficient for its proper functioning.

As will be seen from the above examples, according to this invention at least two binder components are separately emulsified in water, and reacted in a later stage to form a magnetic recording material. As in Example 1, a water-soluble binder can sometimes be used co-jointly therewith. Furthermore, as in Example 6, the magnetic coating composition may contain a resin component which does not directly participate in the reaction. It has been found that in any of these cases the resulting magnetic recording materials have sufficient durability and good characteristics.

These Examples only illustrate the essential points of the present invention, and the invention is not limited by them. Unless the spirit of the invention is departed from, other additives as are generally used in the art, for example, antistatic agents, or abrasive particles as a reinforcing material for the magnetic layer, can be added or mixed therewith.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording material, which comprises separately emulsifying in water at least two components capable of reacting with each other upon mixing, to form at least two separate emulsions, combining the resulting emulsions while maintaining said at least two components in the separated state, coating a magnetic coating composition consisting essentially of a ferromagnetic fine powder, a binder consisting of said at least two components in said combined emulsion, and a coating liquid on a non-magnetic support, drying the coating to form a magnetic recording layer, and curing the resulting magnetic recording layer if drying is insufficient to effect curing thereof, wherein said at least two components contain reactive groups selected from the group consisting of hydroxyl (—OH), carboxyl (—COOH), epoxy

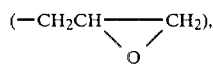

carbonyl (C=O), amino (—NH$_2$), isocyanate (—NCO), or thiocyanate (—NCS), and wherein the molar ratio of reactive groups to react with one another is about 35/65. to 65/35, the amount of binder in the coating composition is 10–70% by weight, as solids content, and is 17–100 parts by weight per 100 parts by weight of the ferromagnetic fine powder.

2. The process of claim 1 wherein said binder components are selected from the group consisting of thermoplastic resins having a softening point of not more than 150° C., an average molecular weight of 10,000 to 200,000 and a degree of polymerization of about 200 to 2,000, and thermosetting resins and reactive resins having a molecular weight of not more than 200,000.

3. The process of claim 2 wherein said thermoplastic resin is present in an amount of 0 to about 15 weight % of the total amount of resin binder.

4. The process of claim 1 wherein said at least two components containing reactive groups are polymers selected from the group consisting of acrylic resins, epoxy resins, polyamide resins, and blocked polyisocyanates.

5. The process of claim 1 wherein the amount of the binder in the coating composition is 20 to 70 parts by weight per 100 parts by weight of the ferromagnetic fine powder.

6. The process of claim 1 wherein the amount of the binder in the coating composition is 25 to 40 parts by weight per 100 parts by weight of the ferromagnetic fine powder.

7. The process of claim 1 wherein the coated magnetic recording layer is subjected to a treatment for orienting the ferromagnetic powder therein.

8. The process of claim 1 wherein the drying is carried out at 50° to 100° C. for 2 to 10 minutes.

9. The process of claim 1 wherein curing is carried out at 30° to 180° C. for 10 seconds to 120 hours after drying.

10. The process of claim 1 wherein the magnetic recording layer has a dry thickness of from about 1 to about 20 um.

11. A magnetic recording material produced by the process of claim 1.

12. The process of claim 1 wherein said components capable of reacting with each other each contain from two to six of said reactive groups.

13. A process for producing a magnetic recording material, which comprises separately emulsifying in water at least two components capable of reacting with each other upon mixing, to form at least two separate emulsions, combining the resulting emulsions while maintaining said at least two components in the separated state, coating a magnetic coating composition consisting essentially of a ferromagnetic fine powder, a binder consisting of said at least two components in said combined emulsion, and a coating liquid on a non-magnetic support, drying the coating to form a magnetic recording layer, and curing the resulting magnetic recording layer if drying is insufficient to effect curing thereof, wherein said at least two components contain reactive groups selected from the group consisting of hydroxyl (—OH), carboxyl (—COOH), epoxy

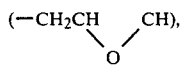

amino (—NH$_2$), or isocyanate (—NCO), and wherein the molar ratio of reactive groups to react with one another is about 36/65 to 65/35, the amount of binder in the coating composition to 10–70% by weight, as solids content, and is 17–100 parts by weight per 100 parts by weight of the ferromagnetic fine powder.

14. The process of claim 13 wherein the at least two components are selected to provide one of the following combinations of reactive groups: epoxy and —NH$_2$; —COOH and —NH$_2$; —COOH and —NCO; —OH, —NCO and —OH; epoxy and —NCO; and —OH and —NCO.

15. The process of claim 13 wherein the reactive groups are epoxy and —NH$_2$.

16. The process of claim 13 wherein the reactive groups are —COOH and —NH$_2$.

17. The process of claim 13 wherein the reactive groups are —COOH and —NCO.

18. The process of claim 13 wherein the reactive groups are —OH, —NCO and —OH.

19. The process of claim 13 wherein the reactive groups are epoxy and —NCO.

20. The process of claim 13 wherein the reactive groups are —OH and —NCO.

* * * * *